J. ALMGREN.
LEVEL.
APPLICATION FILED FEB. 17, 1911.
1,015,608.
Patented Jan. 23, 1912.
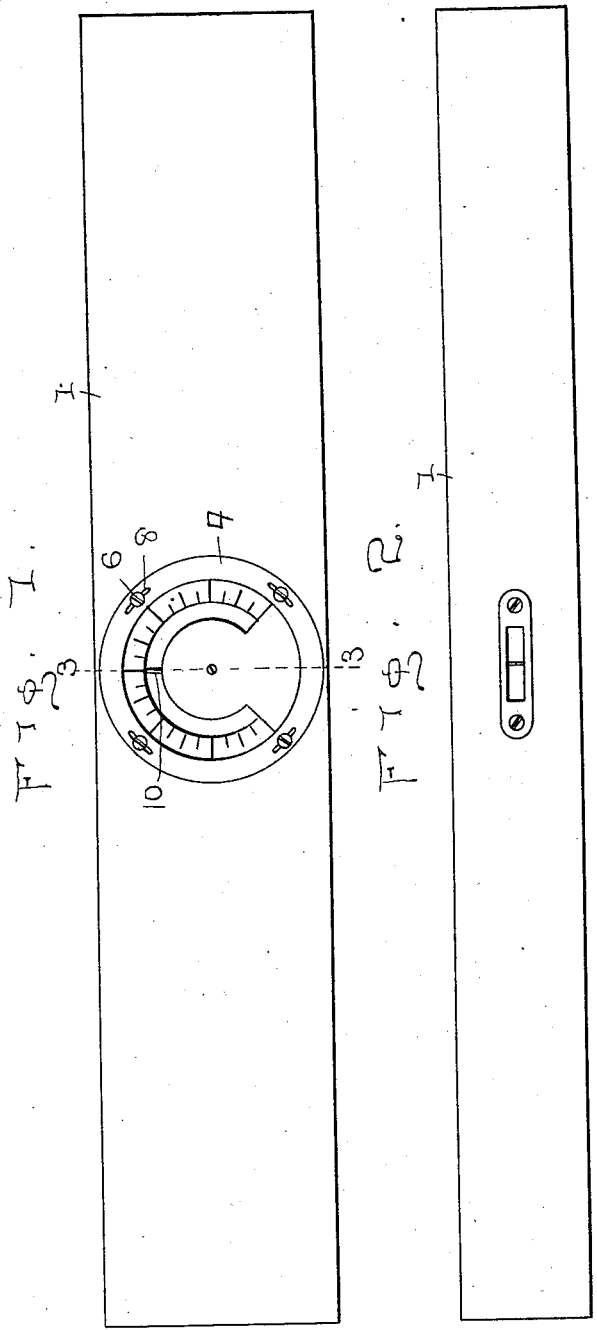
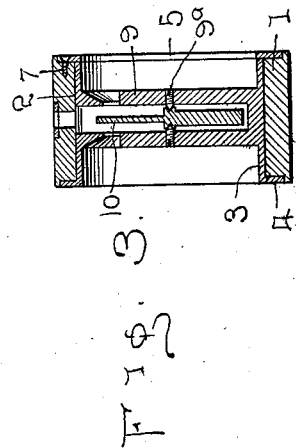
WITNESSES:
INVENTOR
J. Almgren
BY
Attorneys

UNITED STATES PATENT OFFICE.

JOHN ALMGREN, OF SEATTLE, WASHINGTON.

LEVEL.

1,015,608.  Specification of Letters Patent.  Patented Jan. 23, 1912.

Application filed February 17, 1911. Serial No. 609,181.

*To all whom it may concern:*

Be it known that I, JOHN ALMGREN, a citizen of the United States, residing at Seattle, in the county of King and State of Washington, have invented certain new and useful Improvements in Levels; and I do hereby declare the following to be a full, clear, and exact description of the invention, such as will enable others skilled in the art to which it appertains to make and use the same.

My invention relates to new and useful improvements in levels and more particularly to board levels.

The object of my invention is to provide a new and improved form of gravity level.

A further object of my invention is to provide means whereby a leveling device may be readily adjusted relative to the board of the level.

Other objects and advantages of my invention will be hereinafter and more clearly set forth, reference being had to the accompanying drawing in which, Figure 1 is a side elevation of my improved form of level. Fig. 2 is a top plan view thereof, and, Fig. 3 is a vertical sectional view as seen on line 3—3, Fig. 1.

Referring to the drawing in which similar reference numerals designate corresponding parts throughout the several views, 1 is the board of the level which is preferably centrally cut-away, as shown at 2 in Fig. 3.

My improved leveling device is mounted in a substantially cylindrical body portion 3, said body portion being provided with an outwardly extending flange 4 at one end. The body portion 3 is adapted to be inserted through the opening 2 and is secured in place by means of the screws 6 which are passed through the apertures 8 in the flange 4 of the body portion 3 and into the board 1, the apertures 8 being elongated so that the screws 6 may be loosened therein to permit of any desired adjustment of the body portion, after which the screws may be tightened thereby holding the body portion stationary relative to the board 1. A ring 5 is secured to the board 1 by screws 7 Fig. 3 at the opposite side of the device in order that the two sides will present a neat and uniform appearance.

Extending upwardly from the bottom of the body portion, are a pair of standards 9. A pair of screws 9ª are centrally disposed in said standards relative to the body portion, the inner ends of said screws being pointed to form bearings for a weighted pointer 10. The body portion is provided with a pair of inwardly extending flanges adjacent the pointer, said flanges being scaled. The pointer, due to the weight attached thereto, is adapted to stand in a vertical position and will sweep over the scales when the board of the level is moved to different planes.

In Fig. 1, the board of the level is shown in a horizontal position, and in this position, the pointer will be directed toward the central marking upon the scales. Should the board be placed upon a surface which is not horizontal, the pointer will be directed toward a different marking on the scale, thus indicating that the surface is not disposed in a horizantal plane. The scale is so marked that the degree of the plane to the horizontal will be readily indicated. The scales extend through the major portion of a circle and are arranged, as shown in Fig. 1, so that the level board may be used to indicate perpendiculars as well as horizontals. The upper surface of the level board is provided with an opening of the usual form, through which the pointer may be seen. The opening is preferably provided with a covering of transparent material which is centrally marked, so that when the board is in a horizontal position, the end of the pointer will coincide with said marking.

It will be seen that I have provided a leveling device which may be adjusted to compensate for any wear of the parts and it maye be readily adjusted relative to the board of the level.

What I claim is:—

1. A leveling device comprising a board, a cylindrical casing positioned therein, a flange at one end of said casing, a ring secured to said board at the opposite end of said casing, said flange being adjustably connected to said board opposite said ring, said casing having scale flanges extending inwardly from said casing, a pair of standards extending inwardly from one side of said casing and a weighted pointer pivotally mounted in said standards.

2. The combination with a leveling board, of an indicating device therefor, comprising a cylindrical casing, a flange at one end of said casing and adjustably secured to said board, a ring at the opposite end thereof, a pair of standards extending inwardly from one side of said casing, a weighted pointer pivotally mounted in said standards, and scale flanges extending inwardly from said casing, said pointer being adapted for movement over said scale flanges.

In testimony whereof I have signed my name to this specification in the presence of two subscribing witnesses.

JOHN ALMGREN.

Witnesses:
CARL J. SMITH,
ANDREW NELSON.

Copies of this patent may be obtained for five cents each, by addressing the "Commissioner of Patents, Washington, D. C."